United States Patent
Domke et al.

(10) Patent No.: US 8,372,290 B2
(45) Date of Patent: Feb. 12, 2013

(54) MAGNETIC SEPARATION OF NONFERROUS METAL ORES BY MEANS OF MULTI-STAGE CONDITIONING

(75) Inventors: Imme Domke, Jersey City, NJ (US); Alexej Michailovski, Ludwigshafen (DE); Norbert Mronga, Dossenheim (DE); Werner Hartmann, Weisendorf (DE); Wolfgang Krieglstein, Rosstal (DE); Vladimir Danov, Erlangen (DE)

(73) Assignees: BASF SE, Ludwigshafen (DE); Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/203,579

(22) PCT Filed: Mar. 3, 2010

(86) PCT No.: PCT/EP2010/052668
§ 371 (c)(1),
(2), (4) Date: Aug. 26, 2011

(87) PCT Pub. No.: WO2010/100181
PCT Pub. Date: Sep. 10, 2010

(65) Prior Publication Data
US 2011/0303773 A1    Dec. 15, 2011

(30) Foreign Application Priority Data
Mar. 4, 2009 (EP) .................... 09154283

(51) Int. Cl.
*B03C 1/015* (2006.01)
(52) U.S. Cl. ........ 210/695; 210/679; 210/714; 210/724; 210/222; 209/5; 209/8; 209/9; 209/39; 209/214
(58) Field of Classification Search ............ 210/679, 210/695, 714, 724, 222; 209/5, 8, 9, 39, 209/214
See application file for complete search history.

(56) References Cited

U.S. PATENT DOCUMENTS

| | | | |
|---|---|---|---|
| 3,926,789 A | 12/1975 | Shubert | |
| 4,657,666 A | 4/1987 | Snook et al. | |
| 4,834,898 A | 5/1989 | Hwang | |
| 4,906,382 A | 3/1990 | Hwang | |
| 2010/0200510 A1 | 8/2010 | Domke et al. | |
| 2010/0300941 A1 | 12/2010 | Domke et al. | |
| 2010/0307982 A1 | 12/2010 | Domke et al. | |
| 2011/0000826 A1 | 1/2011 | Diez et al. | |
| 2011/0120919 A1 | 5/2011 | Domke et al. | |
| 2011/0120954 A1 | 5/2011 | Domke et al. | |
| 2011/0163278 A1 | 7/2011 | Domke et al. | |
| 2011/0229384 A1 | 9/2011 | Michailovski et al. | |
| 2011/0240527 A1 | 10/2011 | Domke et al. | |
| 2011/0272623 A1 | 11/2011 | Domke et al. | |
| 2011/0303772 A1 | 12/2011 | Michailovski et al. | |
| 2011/0309003 A1 | 12/2011 | Domke et al. | |
| 2012/0000857 A1 | 1/2012 | Domke et al. | |
| 2012/0058463 A1 | 3/2012 | Deuerlein et al. | |

FOREIGN PATENT DOCUMENTS

| WO | 02 066168 | 8/2002 |
|---|---|---|
| WO | 2007 008322 | 1/2007 |
| WO | 2009 010422 | 1/2009 |
| WO | 2010 097361 | 9/2010 |
| WO | 2010 100180 | 9/2010 |

OTHER PUBLICATIONS

Translation of the International Preliminary Report on Patentability for PCT/EP2010/052668, Sep. 4, 2011.*
Gray, S. R. et al., "Recovery Of Fine Gold Particles By Flocculation With Hydrophobic Magnetite", Extractive Metallurgy Conference, Total 5 Pages, (Oct. 2-4, 1991).
International Search Report Issued May 26, 2010 in PCT/EP10/052668 filed Mar. 3, 2010.
International Search Report Issued May 26, 2010 in PCT/EP10/052688 filed Mar. 3, 2010.

* cited by examiner

*Primary Examiner* — David A Reifsnyder
(74) *Attorney, Agent, or Firm* — Oblon, Spivak, McClelland, Maier & Neustadt, L.L.P.

(57) ABSTRACT

The present invention relates to a process for separating at least one first material from a mixture comprising this at least one first material and at least one second material, which comprises at least the following steps:
(A) contacting of the mixture comprising at least one first material and at least one second material with at least one surface-active substance, if appropriate in the presence of at least one dispersion medium, with the surface-active substance binding to the at least one first material,
(B) if appropriate, addition of at least one dispersion medium to the mixture obtained in step (A) in order to obtain a dispersion,
(C) treatment of the dispersion from step (A) or (B) with at least one hydrophobic magnetic particle so that the at least one first material to which the at least one surface-active substance is bound and the at least one magnetic particle agglomerate,
(D) separation of the agglomerate from step (C) from the mixture by application of a magnetic field in order to obtain the agglomerate and a mixture M1 depleted in agglomerate, and repetition of the steps (A) to (D).

20 Claims, No Drawings

MAGNETIC SEPARATION OF NONFERROUS METAL ORES BY MEANS OF MULTI-STAGE CONDITIONING

The present invention relates to process for separating at least one first material from a mixture comprising this at least one first material and at least one second material, in which the first material is firstly brought into contact with a surface-active substance for hydrophobicization, this mixture is then brought into contact with at least one magnetic particle so that the magnetic particle and the hydrophobicized first material agglomerate, this agglomerate is separated off by application of a magnetic field and the remaining mixture is once again treated with a surface-active substance and magnetic particles in order to separate off further first material.

In particular, the present invention relates to a process for the enrichment of ores in the presence of the gangue.

Processes for separating ores from mixtures comprising these are already known from the prior art.

WO 02/0066168 A1 relates to a process for separating ores from mixtures containing them, in which suspensions or slurries of these mixtures are treated with particles which are magnetic and/or can float in aqueous solutions. After addition of the magnetic and/or floatable particles, a magnetic field is applied so that the agglomerates are separated off from the mixture. However, the degree of attachment of the magnetic particles to the ore and the strength of the bond are not sufficient to carry out the process with a sufficiently high yield and effectiveness.

U.S. Pat. No. 4,657,666 discloses a process for the enrichment of ores, in which the ore present in the gangue is reacted with magnetic particles, resulting in formation of agglomerates due to the hydrophobic interactions. The magnetic particles are hydrophobicized on the surface by treatment with hydrophobic compounds so that attachment to the ore occurs. The agglomerates are then separated off from the mixture by means of a magnetic field. The document cited also discloses that the ores are treated with a surface-activating solution of 1% of sodium ethylxanthogenate before the magnetic particle is added. In this process, separation of ore and magnetic particle is effected by destruction of the surface-activating substance which has been applied in the form of the surface-activating solution to the ore. Furthermore, only $C_4$ hydrophobicizing agents are used for the ore in this process.

U.S. Pat. No. 4,834,898 discloses a process for separating off nonmagnetic materials by bringing them into contact with magnetic reagents which are enveloped in two layers of surface-active substances. U.S. Pat. No. 4,834,898 further discloses that the surface charge of the nonmagnetic particles which are to be separated off can be influenced by various types and concentrations of electrolyte reagents. For example, the surface charge is altered by addition of multivalent anions, for example tripolyphosphate ions.

S. R. Gray, D. Landberg, N. B. Gray, Extractive Metallurgy Conference, Perth, 2-4 Oct. 1991, pages 223-226, discloses a process for recovering small gold particles by bringing the particles into contact with magnetite. Before the contacting, the gold particles are treated with potassium amylxanthogenate. A process for separating off the gold particles from at least one hydrophilic material is not disclosed in this document.

WO 2007/008322 A1 discloses a magnetic particle which is hydrophobicized on the surface for the separation of impurities from mineral substances by magnetic separation processes. According to WO 2007/008322 A1, a dispersant selected from among sodium silicate, sodium polyacrylate and sodium hexametaphosphate can be added to the solution or dispersion.

It is an object of the present invention to provide a process by means of which at least one first material can be separated off efficiently from mixtures comprising at least one first material and at least one second material. A further object of the present invention is to treat the first particles which are to be separated off in such a way that the agglomerate of magnetic particle and first material is sufficiently stable to ensure a high yield of the first material in the separation. Another object of the present invention is to provide a process in which very little surface-active substance has to be used and at the same time a high proportion of the at least one first material can be separated off.

These objects are achieved by a process for separating at least one first material from a mixture comprising this at least one first material and at least one second material, which comprises at least the following steps:

(A) contacting of the mixture comprising at least one first material and at least one second material with at least one surface-active substance, if appropriate in the presence of at least one dispersion medium, with the surface-active substance binding to the at least one first material, (B) if appropriate, addition of at least one dispersion medium to the mixture obtained in step (A) in order to obtain a dispersion, (C) treatment of the dispersion from step (A) or (B) with at least one hydrophobic magnetic particle so that the at least one first material to which the at least one surface-active substance is bound and the at least one magnetic particle agglomerate, (D) separation of the agglomerate from step (C) from the mixture by application of a magnetic field in order to obtain the agglomerate and a mixture M1 depleted in agglomerate, (E) renewed contacting of the mixture M1 from step (D) with at least one surface-active substance, with the surface-active substance binding to the at least one first material which is still present in the mixture M1 from step (D), (F) if appropriate, addition of at least one dispersant to the mixture obtained in step (E) in order to obtain a dispersion, (G) treatment of the dispersion from step (E) or (F) with at least one hydrophobic magnetic particle so that the at least one first material to which the at least one surface-active substance is bound and the at least one magnetic particle agglomerate, (H) separation of the agglomerate from step (G) from the mixture by application of a magnetic field in order to obtain the agglomerate and a mixture M2 depleted in agglomerate and (I) if appropriate, repetition of the steps (E) to (H).

The process of the invention preferably serves to separate off at least one first, hydrophobic material from a mixture comprising this at least one first, hydrophobic material and at least one second, hydrophilic material.

For the purposes of the present invention, "hydrophobic" means that the corresponding particle can have been hydrophobicized subsequently by treatment with the at least one surface-active substance. It is also possible for an intrinsically hydrophobic particle to be additionally hydrophobicized by treatment with the at least one surface-active substance.

"Hydrophobic" means, for the purposes of the present invention, that the surface of a corresponding "hydrophobic substance" or a "hydrophobicized substance" has a contact angle of >90° with water against air. "Hydrophilic" means, for the purposes of the present invention, that the surface of a corresponding "hydrophilic substance" has a contact angle of <90° with water against air.

In a preferred embodiment of the process of the invention, the at least one first material is at least one hydrophobic metal compound or coal, and the at least one second material is preferably at least one hydrophilic metal compound.

The at least one first material to be separated off is thus preferably a metal compound selected from the group consisting of sulfidic ores, oxidic and/or carbonate-comprising ores, for example azurite $[Cu_3(CO_3)_2(OH)_2]$ or malachite $[Cu_2[OH]_2|CO_3]]$, or noble metals and the compounds thereof to which a surface-active compound can bind selectively to produce hydrophobic surface properties.

The at least one hydrophilic metal compound is preferably selected from the group consisting of oxidic and hydroxidic metal compounds, for example silicon dioxide $SiO_2$, silicates, aluminosilicates, for example feldspars, for example albite $Na(Si_3Al)O_8$, mica, for example muscovite $KAl_2[(OH,F)_2AlSi_3O_{10}]$, garnets $(Mg, Ca, Fe^{II})_3(Al, Fe^{III})_2(SiO_4)_3$, $Al_2O_3$, FeO(OH), $FeCO_3$, $Fe_2O_3$, $Fe_3O_4$ and further related minerals and mixtures thereof.

Examples of sulfidic ores which can be used according to the invention are, for example, selected from the group of copper ores consisting of covellite CuS, molybdenum(IV) sulfide, chalcopyrite (copper pyrite) $CuFeS_2$, bornite $Cu_5FeS_4$, chalcocite (copper glance) $Cu_2S$ and mixtures thereof. In a preferred embodiment, two or more first materials, for example mixtures comprising two or more of the abovementioned sulfidic copper ores, are present in the mixture to be treated according to the invention.

Suitable oxidic metal compounds which can be used according to the invention are preferably selected from the group consisting of silicon dioxide $SiO_2$, silicates, aluminosilicates, for example feldspars, for example albite $Na(Si_3Al)O_8$, mica, for example muscovite $KAl_2[(OH,F)_2AlSi_3O_{10}]$, garnets $(Mg, Ca, Fe^{II})_3(Al, Fe^{III})_2(SiO_4)_3$ and further related minerals and mixtures thereof.

Accordingly, the process of the invention is preferably carried out using untreated ore mixtures obtained from mine deposits.

In a preferred embodiment of the process of the invention, the mixture comprising at least one first material and at least one second material is present in the form of particles having a size of from 100 nm to 100 μm in step (A), see, for example, U.S. Pat. No. 5,051,199. In a preferred embodiment, this particle size is obtained by milling. Suitable processes and apparatuses are known to those skilled in the art, for example wet milling in a ball mill. A preferred embodiment of the process of the invention thus comprises milling the mixture comprising at least one first material and at least one second material to particles having a size of from 100 nm to 100 μm before or during step (A). Ore mixtures which can preferably be used have a content of sulfidic minerals of at least 0.4% by weight, particularly preferably at least 10% by weight.

Examples of sulfidic minerals present in the mixtures which can be used according to the invention are those mentioned above. In addition, sulfides of metals other than copper, for example sulfides of iron, lead, zinc or molybdenum, i.e. $FeS/FeS_2$, PbS, ZnS or $MoS_2$, can be present in the mixtures. Furthermore, oxidic compounds of metals and semimetals, for example silicates or borates or other salts of metals and semimetals, for example phosphates, sulfates or oxides/hydroxides/carbonates and further salts, for example azurite $[Cu_3(CO_3)_2(OH)_2]$, malachite $[Cu_2[(OH)_2(CO_3)]]$, barite $(BaSO_4)$, monazite $((La—Lu)PO_4)$, can be present in the ore mixtures to be treated according to the invention. Further examples of the at least one first material which is separated off by means of the process of the invention are noble metals, for example Au, Pt, Pd, Rh, etc., preferably in the native state.

An ore mixture which is typically used and can be separated by the process of the invention has the following composition: about 30% by weight of $SiO_2$, about 10% by weight of $Na(Si_3Al)O_8$, about 3% by weight of $Cu_2S$, about 1% by weight of $MoS_2$, balance chromium, iron, titanium and magnesium oxides.

The individual steps of the process of the invention are described in detail below:

Step (A):

Step (A) of the process of the invention comprises contacting the mixture comprising at least one first material and at least one second material with at least one surface-active substance, if appropriate in the presence of at least one dispersion medium, with the surface-active substance binding selectively to the at least one first material.

Suitable and preferred first and second materials are mentioned above.

For the purposes of the present invention, "surface-active substance" means a substance which is able to alter the surface of the particle to be separated off in the presence of other particles which are not to be separated off in such a way that attachment of a hydrophobic particle occurs as a result of hydrophobic interactions. Surface-active substances which can be used according to the invention bind to the at least one first material and thereby make the first material suitably hydrophobic.

The process of the invention is preferably carried out using a surface-active substance of the general formula (I)

$$A\text{-}Z \quad (I)$$

which binds to the at least one first material, where

A is selected from among linear or branched $C_3$-$C_{30}$-alkyl, $C_3$-$C_{30}$-heteroalkyl, optionally substituted $C_6$-$C_{30}$-aryl, optionally substituted $C_6$-$C_{30}$-heteroalkyl, $C_6$-$C_{30}$-arylalkyl and Z is a group by means of which the compound of the general formula (I) binds to the at least one hydrophobic material.

In a particularly preferred embodiment, A is a linear or branched $C_4$-$C_{12}$-alkyl, very particularly preferably a linear $C_4$- to $C_8$-alkyl. Heteroatoms which may be present according to the invention are selected from among N, O, P, S and halogens such as F, Cl, Br and I.

In a further preferred embodiment, A is preferably a linear or branched, preferably linear, $C_6$-$C_{20}$-alkyl. A is also preferably a branched $C_6$-$C_{14}$-alkyl in which the at least one substituent, preferably having from 1 to 6 carbon atoms, is preferably present in the 2 position, for example 2-ethylhexyl and/or 2-propylheptyl.

In a further particularly preferred embodiment, Z is selected from the group consisting of anionic groups —$(X)_n$—$PO_3^{2-}$, —$(X)_n$—$PO_2S^{2-}$, —$(X)_n$—$POS_2^{2-}$, —$(X)_n$—$PS_3^{2-}$, —$(X)_n$—$PS_2^-$, —$(X)_n$—$POS^-$, —$(X)_n$—$PO_2^-$, —$(X)_n$—$PO_3^{2-}$—$(X)_n$—$CO_2^-$, —$(X)_n$—$CS_2^-$, —$(X)_n$—$COS^-$, —$(X)_n$—$C(S)NHOH$, —$(X)_n$—$S^-$ where X is selected from the group consisting of O, S, NH, $CH_2$ and n=0, 1 or 2, if appropriate with cations selected from the group consisting of hydrogen, $NR_4^+$ where the radicals R are each, independently of one another, hydrogen and/or $C_1$-$C_8$-alkyl, an alkali metal or alkaline earth metal. The anions mentioned and the corresponding cations form, according to the invention, uncharged compounds of the general formula (I).

If n=2 in the formulae mentioned, then two identical or different, preferably identical, groups A are bound to a group Z.

In a particularly preferred embodiment, use is made of compounds selected from the group consisting of xanthates A-O—$CS_2^-$, dialkyldithiophosphates $(A-O)_2$—$PS_2^-$, dialkyldithioposphinates $(A)_2$-$PS_2^-$ and mixtures thereof, where the radicals A are each, independently of one another, a linear or branched, preferably linear, $C_6$-$C_{20}$-alkyl, for example n-octyl, or a branched $C_6$-$C_{14}$-alkyl, with the branch preferably being present in the 2 position, for example 2-ethylhexyl and/or 2-propylheptyl. Counterions in these compounds are preferably cations selected from the group consisting of hydrogen, $NR_4^+$ where the radicals R are each, independently of one another, hydrogen and/or $C_1$-$C_8$-alkyl, an alkali metal or alkaline earth metal, in particular sodium or potassium.

Very particularly preferred compounds of the general formula (I) are selected from the group consisting of sodium or potassium n-octylxanthate, sodium or potassium butylxanthate, sodium or potassium di-n-octyldithiophosphinate, sodium or potassium di-n-octyldithiophosphate, and mixtures of these compounds.

In the case of noble metals, for example Au, Pd, Rh etc., particularly preferred surface-active substances are monothiols, dithiols and trithiols or 8-hydroxyquinoline, for example as described in EP 1200408 B1.

In the case of metal oxides, for example FeO(OH), $Fe_3O_4$, ZnO etc., carbonates, for example azurite $[Cu(CO_3)_2(OH)_2]$, malachite $[Cu_2[(OH)_2CO_3]]$, particularly preferred surface-active substances are octylphosphonic acid (OPS), $(EtO)_3Si$-A, $(MeO)_3Si$-A, with the abovementioned meanings for A.

In the case of metal sulfides, for example $Cu_2S$, $MoS_2$, etc., particularly preferred surface-active substances are thiols, xanthates, hydroxamates and thiocarbamates.

In a further preferred embodiment of the process of the invention, Z is —$(X)_n$—$CS_2^-$, —$(X)_n$—$PO_2^-$ or —$(X)_n$—$S^-$ where X is O and n is 0 or 1 and a cation selected from among hydrogen, sodium and potassium. Very particularly preferred surface-active substances are 1-octanethiol, potassium n-octylxanthate, potassium butylxanthate, octylphosphonic acid or a compound of the formula (IV)

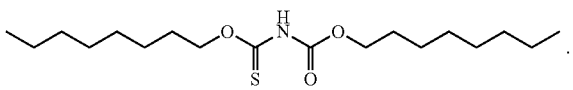

(IV)

In a particularly preferred embodiment, thiols, xanthates, hydroxamates and thiocarbamates having $C_1$-$C_8$-alkyl radicals are used for the first conditioning step in the process. In a very particularly preferred embodiment, $C_2$- and $C_4$-xanthates are used. In a further very particularly preferred embodiment, mixtures of $C_2$- and $C_8$-xanthates are used.

According to the invention, the same or different surface-active substances can be used in the two hydrophobicizing steps (A) and (E).

Particularly when two or more first materials, in particular ores, are present in the mixture to be treated according to the invention, this first conditioning step preferentially hydrophobicizes the sulfinic copper minerals which have a high affinity for the surface-active substance. These can be separated off magnetically after addition of the at least one magnetic particle. Minerals having a lower affinity for the surface-active substance preferably remain. These are then hydrophobicized by means of a second conditioning step (step (E)), if appropriate using a different surface-active substance. The advantage of the at least two-stage process of the invention is that, preferably when two or more first materials are present, one of the first materials present is treated with a surface-active substance which has a particular affinity for this first material and separated off in one step. In a second step, another first material is then treated with another surface-active substance which has a particular affinity for this further first material and is also separated off. According to the invention, the same surface-active substance can also be used in the two steps. In both embodiments of the process of the invention, the total amount of surface-active substance is generally lower than in a single-stage process.

The contacting in step (A) of the process of the invention can occur by all methods known to those skilled in the art. Step (A) can be carried out in bulk or in dispersion, preferably in suspension, particularly preferably in aqueous suspension.

In an embodiment of the process of the invention, step (A) is carried out in bulk, i.e. in the absence of a dispersion medium.

For example, the mixture to be treated and the at least one surface-active substance are combined and mixed without further dispersion medium in the appropriate amounts. Suitable mixing apparatuses are known to those skilled in the art, for example mills such as a ball mill.

In a further preferred embodiment, step (A) is carried out in dispersion, preferably in suspension. Suitable dispersion media are all dispersion media in which the mixture from step (A) is not completely soluble. Suitable dispersion media for producing the slurry or dispersion in step (B) of the process of the invention are selected from the group consisting of water, water-soluble organic compounds, for example alcohols having from 1 to 4 carbon atoms, and mixtures thereof.

In a particularly preferred embodiment, the dispersion medium in step (A) is water.

Step (A) of the process of the invention is generally carried out at a temperature of from 1 to 80° C., preferably from 20 to 40° C., particularly preferably at ambient temperature. The pH is set according to the mixture to be treated; preference is given to setting a slightly alkaline pH, for example from 8 to 10, in particular 9.

The at least one surface-active substance is generally used in an amount of from 10 to 350 g/t, preferably from 50 to 180 g/t, in each case based on the total mixture to be treated, in step (A). The amount which is particularly preferably used depends in each case on the type of mixture to be treated. If, for example, porphyritic ore having a content of 0.7% by weight of Cu which is present mainly as sulfidic copper, e.g. as bornite, chalcocite or chalcopyrite, is treated, the preferred amount of, for example, $C_2$-/$C_8$-xanthate is from 110 to 150 g/t, particularly preferably 130 g/t.

Step (B):

The optional step (B) of the process of the invention comprises addition of at least one dispersion medium to the mixture obtained in step (A) in order to obtain a dispersion.

The mixture obtained in step (A) comprises, in one embodiment, if step (A) is carried out in bulk, at least one first material which has been modified on the surface by at least one surface-active substance and at least one second material. If step (A) is carried out in bulk, step (B) of the process of the invention is carried out, i.e. at least one suitable dispersion medium is added to the mixture obtained in step (A) in order to obtain a dispersion.

In the embodiment in which step (A) of the process of the invention is carried out in dispersion, step (B) is not carried out. However, in this embodiment, too, it is possible to carry out step (B), i.e. to add further dispersion medium in order to obtain a dispersion having a lower concentration.

Suitable dispersion media are all dispersion media which have been mentioned above in respect of step (A). In a particularly preferred embodiment, the dispersion medium in step (B) is water.

Thus, step (B) comprises either converting the mixture present in bulk from step (A) into a dispersion or converting the mixture already present in dispersion from step (A) into a dispersion having a lower concentration by addition of dispersion medium.

In general, the amount of dispersion medium added in step (A) and/or step (B) can, according to the invention, be selected so that a dispersion which is readily stirrable and/or flowable is obtained. In a preferred embodiment, the amount of mixture to be treated based on the total slurry or dispersion is up to 100% by weight, particularly preferably from 0.5 to 10% by weight.

In a preferred embodiment of the process of the invention, step (B) is not carried out but instead step (A) is carried out in aqueous dispersion, so that step (A) directly gives a mixture in aqueous dispersion which has the correct concentration for it to be used in step (C) of the process of the invention.

The addition of dispersion medium in step (B) of the process of the invention can, according to the invention, be carried out by all methods known to those skilled in the art.

Step (C):

Step (C) of the process of the invention comprises treating the dispersion from step (A) or (B) with at least one hydrophobic magnetic particle so that the at least one first material, which has been hydrophobicized in step (A) and to which the at least one surface-active substance is bound, and the at least one magnetic particle agglomerate.

In step (C) of the process of the invention, it is possible to use all magnetic substances and materials known to those skilled in the art. In a preferred embodiment, the at least one magnetic particle is selected from the group consisting of magnetic metals, for example iron, cobalt, nickel and mixtures thereof, ferromagnetic alloys of magnetic metals, for example NdFeB, SmCo and mixtures thereof, magnetic iron oxides, for example magnetite, maghemite, cubic ferrites of the general formula (II)

$$M^{2+}_xFe^{2+}_{1-x}Fe^{3+}_2O_4 \qquad (II)$$

where
M is selected from among Co, Ni, Mn, Zn and mixtures thereof and
$x \leq 1$,
hexagonal ferrites, for example barium or strontium ferrite $MFe_6O_{19}$ where M=Ca, Sr, Ba, and mixtures thereof. The magnetic particles can additionally have an outer layer, for example of $SiO_2$.

In a particularly preferred embodiment of the present patent application, the at least one magnetic particle is magnetite or cobalt ferrite $Co^{2+}_xFe^{2+}_{1-x}Fe^{3+}_2O_4$ where $x \leq 1$.

In a preferred embodiment, the magnetic particles used in step (C) of the process of the invention have a size of from 100 nm to 100 μm, particularly preferably from 1 to 50 μm. The magnetic particles can be brought to the appropriate size by methods known to those skilled in the art, for example by milling, before use in step (C). Furthermore, the particles prepared by a precipitation reaction can be brought to this particle size by setting of the reaction parameters (e.g. pH, reaction time, temperature).

In a further preferred embodiment, the at least one magnetic particle is hydrophobicized on the surface by means of at least one hydrophobic compound. The hydrophobic compound is preferably selected from among compounds of the general formula (III)

where
B is selected from among linear or branched $C_3$-$C_{30}$-alkyl, $C_3$-$C_{30}$-heteroalkyl, optionally substituted $C_6$-$C_{30}$-aryl, optionally substituted $C_6$-$C_{30}$-heteroalkyl, $C_6$-$C_{30}$-arylalkyl and
Y is a group by means of which the compound of the general formula (III) binds to the at least one magnetic particle.

In a particularly preferred embodiment, B is a linear or branched $C_6$-$C_{18}$-alkyl, preferably linear $C_8$-$C_{12}$-alkyl, very particularly preferably a linear $C_{12}$-alkyl. Heteroatoms which may be present according to the invention are selected from among N, O, P, S and halogens such as F, Cl, Br and I.

In a further particularly preferred embodiment, Y is selected from the group consisting of $-(X)_n-SiHal_3$, $-(X)_n-SiHHal_2$, $-(X)_n-SiH_2Hal$ where Hal is F, Cl, Br, I, and anionic groups such as $-(X)_n-SiO_3^{3-}$, $-(X)_n-PO_3^{2-}$, $-(X)_n-PO_2S^{2-}$, $-(X)_n-POS_2^{2-}$, $-(X)_n-PS_3^{2-}$, $-(X)_n-PS_2^-$, $-(X)_n-POS^-$, $-(X)_n-PO_2^-$, $-(X)_n-CO_2$, $-(X)_n-CS_2^-$, $-(X)_n-COS^-$, $-(X)_n-C(S)NHOH$, $-(X)_n-S^-$ where $X=O, S, NH, CH_2$ and $n=0, 1$ or 2, and, if appropriate, cations selected from the group consisting of hydrogen, $NR_4^+$ where the radicals R are each, independently of one another, hydrogen and/or $C_1$-$C_8$-alkyl, an alkali metal, an alkaline earth metal or zinc, also $-(X)_n-Si(OZ)_3$ where $n=0, 1$ or 2 and Z=charge, hydrogen or short-chain alkyl radical.

If $n=2$ in the formulae mentioned, then two identical or different, preferably identical, groups B are bound to a group Y.

Very particularly preferred hydrophobicizing substances of the general formula (III) are alkyltrichlorosilanes (alkyl group having 6-12 carbon atoms), alkyltrimethoxysilanes (alkyl group having 6-12 carbon atoms), octylphosphonic acid, lauric acid, oleic acid, stearic acid or mixtures thereof.

The treatment of the solution or dispersion with at least one hydrophobic magnetic particle in step (C) of the process of the invention can be carried out by all methods known to those skilled in the art.

In a preferred embodiment, the at least one magnetic particle is dispersed in a suitable dispersion medium.

Suitable dispersion media are all dispersion media in which the at least one magnetic particle is not completely soluble. Suitable dispersion media for dispersion in step (C) of the process of the invention are selected from the group consisting of water, water-soluble organic compounds and mixtures thereof, particularly preferably water. Particular preference is given to using the same dispersion medium in step (C) as in step (B).

In general, the amount of dispersion medium for predispersing the magnetic particles can, according to the invention, be selected so that a slurry or dispersion which is readily stirrable and/or flowable is obtained. In a preferred embodiment, the amount of mixture to be treated based on the total slurry or dispersion is up to 60% by weight.

The dispersion of the magnetic particles can, according to the invention, be produced by all methods known to those skilled in the art. In a preferred embodiment, the magnetic particles to be dispersed and the appropriate amount of dispersion medium or mixture of dispersion media are combined in a suitable reactor, for example a glass reactor, and stirred by means of apparatuses known to those skilled in the art, for example in a glass tank using a mechanically operated propeller stirrer, for example at a temperature of from 1 to 80° C., preferably at room temperature.

The treatment of the dispersion from step (B) with at least one hydrophobic magnetic particle is generally carried out by combining the two components using methods known to those skilled in the art. In a preferred embodiment, a dispersion of the at least one magnetic particle is added to the mixture which has been treated beforehand with at least one surface-active substance. In a further embodiment, the magnetic particle can be added in solid form to a dispersion of the mixture to be treated. In a further preferred embodiment, both components are present in dispersed form.

Step (C) is generally carried out at a temperature of from 1 to 80° C., preferably from 10 to 30° C.

In step (C), the at least one magnetic particle forms an agglomerate with the hydrophobic material of the mixture to be treated. The bond between the two components is based on hydrophobic interactions. In general, no bonding interaction occurs between the at least one magnetic particle and the hydrophilic component of the mixture, so that no agglomeration between these components occurs. Thus, agglomerates of the at least one hydrophobic material and the at least one magnetic particle are present in addition to the at least one hydrophilic material in the mixture after step (C).

In general, magnetic particles are added in step (C) in such an amount that very complete separation of the at least one first material is achieved. The weight ratio of the at least one first material present in the mixture to the at least one magnetic particle is generally from 0.1:1 to 1:20. The precise ratio depends in each case on the mixture which is to be separated magnetically and also on the magnetic separation apparatus, e.g. in respect of flow velocities, solids content of the pulp, etc.

Step (D):

Step (D) of the process of the invention comprises separation of the agglomerate from step (C) from the mixture by application of a magnetic field in order to obtain the agglomerate and a mixture M1 depleted in the agglomerate.

In the embodiment in which two or more first materials are present in the mixture to be treated, the mixture M1 comprises predominantly the constituents of the starting mixture which have a low affinity for the surface-active substance used in step (A). In the embodiment in which one first material is present in the mixture to be treated, the mixture M1 comprises predominantly remaining first material which has not yet been separated off in steps (A) to (C).

In a preferred embodiment, step (D) can be carried out by introducing a permanent magnet into the reactor in which the mixture from step (C) is present. In a preferred embodiment, a dividing wall composed of nonmagnetic material, for example the glass wall of the reactor, is present between the permanent magnet and the mixture to be treated. In a further preferred embodiment of the process of the invention, an electromagnet which is only magnetic when an electric current flows is used in step (D). Suitable apparatuses are known to those skilled in the art.

Step (D) of the process of the invention can be carried out at any suitable temperature, for example from 10 to 60° C.

During step (D), the mixture is preferably continually stirred by means of a suitable stirrer, for example a Teflon stirrer bar or a propeller stirrer.

In step (D) of the process of the invention, firstly the agglomerate of at least one magnetic particle and at least one first material and, secondly, a mixture M1 depleted in agglomerate are obtained. According to the invention, this is achieved by separating off the magnetic agglomerate from the mixture M1 by application of a magnetic field. Since the agglomerate is separated off in this way, the liquid phase is depleted, i.e. less agglomerate is present in the liquid phase after step (D) than before step (D). The mixture M1 generally comprises the at least one first material which has not yet been separated off in the first separation step, the at least one second material and at least one dispersion medium.

In step (D), the agglomerate can generally be separated off by all methods known to those skilled in the art. In one embodiment, it is possible, for example, to drain the mixture M1 comprising the dispersion medium, the at least one second material and any (at least one) first material which has not yet been separated off from the reactor used for step (D) through a bottom valve or pump away the components of the suspension which have not been held by the at least one magnet through a hose. The amount of at least one first material in mixture M1 is still at least 0.1% by weight.

Step (E):

Step (E) of the process of the invention comprises renewed contacting of mixture M1 from step (D) with at least one surface-active substance, with the surface-active substance binding to the at least one first material which is still present in the mixture M1 from step (D).

The mixture M1 obtained in step (D) still comprises, inter alia, proportions of the at least one first material which is to be separated off by the process of the invention. Since, however, the removal of the at least one first material is generally not complete in step (D), first material is still present in the mixture M1 and should be separated off, if possible completely, in the subsequent steps. For this reason, the mixture M1 is, according to the invention, once again brought into contact with at least one surface-active substance.

In step (E) of the process of the invention, it is generally possible to use surface-active substances which come from the group mentioned for step (A). The surface-active substances in steps (A) and (E) can be identical or different.

The present invention therefore provides the process of the invention in which the surface-active substances in steps (A) and (E) are identical.

Furthermore, the present invention provides the process of the invention in which the surface-active substances in steps (A) and (E) are different.

In step (E) of the process of the invention, very particularly preferred surface-active substances are potassium $C_2$-$C_{20}$-xanthates, thiols, thiocarbamates, hydroxamates or a compound of the general formula (IV)

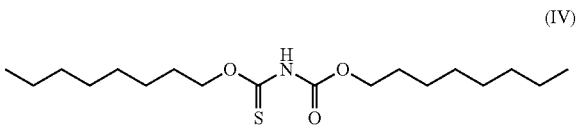

(IV)

The contacting in step (E) of the process of the invention can be effected by all methods known to those skilled in the art. Since the mixture M1 is treated in step (E), the dispersion medium from the preceding steps is generally still present, so that step (E) is generally carried out in dispersion, preferably in suspension, particularly preferably in aqueous suspension.

Step (E) of the process of the invention is generally carried out at a temperature of from 1 to 80° C., preferably from 20 to 40° C., particularly preferably at ambient temperature.

The at least one surface-active substance is generally used in step (E) in a smaller amount than in step (A) of the process of the invention. In a preferred embodiment, the at least one surface-active substance is used in an amount of from 20 to 300 g/t, particularly preferably from 40 to 100 g/t, in each case based on the total mixture to be treated, in step (E).

Step (F):

Step (F) of the process of the invention comprises treatment of the dispersion from step (E) with at least one hydrophobic magnetic particle so that the at least one first material to which the at least one surface-active substance is bound and the at least one magnetic particle agglomerate.

In step (F), agglomeration of the at least one magnetic particle to the at least one first material to which the at least one surface-active substance is bound occurs so as to form a corresponding magnetic agglomerate which can be separated off by application of a magnetic field during the further course of the process of the invention.

In principle, step (F) of the process of the invention can be carried out in a manner analogous to step (C) of the process of the invention. The details and preferred embodiments mentioned for step (C) thus also apply to the step (F) according to the invention.

The at least one magnetic particle can be selected from the group mentioned for step (C). In one embodiment of the process of the invention, the magnetic particles in steps (C) and (F) are identical. In a further embodiment of the process of the invention, the magnetic particles in steps (C) and (F) are different.

In general, magnetic particles are added in step (F) in such an amount that very complete removal of any of the at least one first material still present is achieved. In a preferred embodiment, the same amount of magnetic particles is added in step (F) as in step (C).

Step (G):

Step (G) of the process of the invention comprises separation of the agglomerate from step (F) from the mixture by application of a magnetic field in order to obtain the agglomerate and a mixture M2 depleted in agglomerate. The mixture M2 may still contain amounts of the at least one first material if this has not been separated off virtually completely in the preceding steps, the at least one second material and dispersion medium.

In principle, step (G) of the process of the invention can be carried out in a manner analogous to step (D) of the process of the invention. The details and preferred embodiments mentioned for step (D) thus also apply to step (G) according to the invention.

Compared to the processes of the prior art, the process of the invention has the advantage that the multistage conditioning and separation of the at least one first material from the mixture to be treated according to the invention makes it possible to separate off the same proportion of at least one first material using a smaller total amount of surface-active substance for conditioning the at least one first material. Furthermore, the process of the invention makes it possible to separate off a larger proportion of at least one first material from the mixture when the same total amount of surface-active substance is used for conditioning. The process of the invention thus allows at least one first material to be separated off more efficiently and completely from a corresponding mixture than is made possible by the processes of the prior art.

Step (H):

The optional step (H) of the process of the invention comprises repetition of the steps (E) to (G), i.e. it is possible according to the invention to repeat the treatment of the residue with at least one surface-active substance, the contacting with a magnetic particle to form an agglomerate and the removal of this agglomerate by application of a magnetic field as per step (G), i.e. the mixtures which are obtained after the agglomerates of at least one first material and magnetic particles have been separated off are treated one or more further time(s) with in each case at least one surface-active substance so that any first material which has not yet been separated off is hydrophobicized and agglomerated with a magnetic particle.

Step (I):

In a preferred embodiment, the process of the invention comprises the following step (I):

The optional step (I) of the process of the invention comprises dissociation of the agglomerate separated off in step (D) and (G) in order to obtain the at least one first material and the at least one magnetic particle separately.

In a preferred embodiment of the process of the invention, the dissociation step (I) is carried out in a nondestructive manner, i.e. the individual components present in the dispersion are not altered chemically. For example, the dissociation according to the invention is not effected by oxidation of the hydrophobicizing agent, for example to give the oxidation products or degradation products of the hydrophobicizing agent.

The dissociation can be carried out by all methods known to those skilled in the art which are suitable for dissociating the agglomerate in such a way that the at least one magnetic particle can be recovered in reusable form. In a preferred embodiment, the magnetic particle which has been split off is reused in step (C) or (F).

In a preferred embodiment, the dissociation in step (I) of the process of the invention is effected by treating the agglomerate with a substance selected from the group consisting of organic solvents, basic compounds, acidic compounds, oxidants, reducing agents, surface-active compounds and mixtures thereof.

Examples of suitable organic solvents are methanol, ethanol, propanol, for example n-propanol or isopropanol, aromatic solvents, for example benzene, toluene, xylenes, ethers, for example diethyl ether, methyl t-butyl ether, ketones, for example acetone, aromatic or aliphatic hydrocarbons, for example saturated hydrocarbons having, for example, from 8 to 16 carbon atoms, for example dodecane and/or Shellsol®, diesel fuels and mixtures thereof. The main constituents of diesel fuel are predominantly alkanes, cycloalkanes and aromatic hydrocarbons having from about 9 to 22 carbon atoms per molecule and a boiling range from 170° C. to 390° C.

Examples of basic compounds which can be used according to the invention are aqueous solutions of basic compounds, for example aqueous solutions of alkali metal and/or alkaline earth metal hydroxides, for example KOH, NaOH, milk of lime, aqueous ammonia solutions, aqueous solutions of organic amines of the general formula $R^2_3N$, where the radicals $R^2$ are selected independently from the group consisting of $C_1$-$C_8$-alkyl, optionally substituted by further functional groups. In a preferred embodiment, step (I) is carried out by adding aqueous NaOH solution to a pH of 13, for example for separating off $Cu_2S$ modified with OPA. The acidic compounds can be mineral acids, for example HCl, $H_2SO_4$, $HNO_3$ or mixtures thereof, organic acids, for example carboxylic acids. As oxidant, it is possible to use, for example, $H_2O_2$, for example as 30% strength by weight aqueous solution (perhydrol). To separate off $Cu_2S$ modified with thiols, preference is given to using $H_2O_2$ or $Na_2S_2O_4$.

Examples of surface-active compounds which can be used according to the invention are nonionic, anionic, cationic and/or zwitterionic surfactants.

In a preferred embodiment, the agglomerate of hydrophobic material and magnetic particle is dissociated by means of an organic solvent, particularly preferably by means of acetone and/or diesel. This process can also be aided mechanically. In a preferred embodiment, ultrasound is used for aiding of the dissociation process.

In general, the organic solvent is used in an amount which is sufficient to dissociate virtually all the agglomerate. In a preferred embodiment, from 20 to 100 ml of the organic solvent are used per gram of agglomerate of hydrophobic material and magnetic particle which is to be dissociated.

According to the invention, the at least one first material and the at least one magnetic particle are present as a dispersion in said dissociation reagent, preferably an organic solvent, after the dissociation.

The at least one magnetic particle is separated off from the dispersion comprising this at least one magnetic particle and the at least one first material by means of a permanent magnet or electromagnet. Details of this separation are analogous to step (D) or (G) of the process of the invention.

The first material to be separated off, preferably the metal compound to be separated off, is preferably separated from the organic solvent by distilling off the organic solvent. The first material which can be obtained in this way can be purified by further processes known to those skilled in the art. The solvent can, if appropriate after purification, be recirculated to the process of the invention.

EXAMPLES

Example according to the invention:

100 g of a porphyritic ore (Cu content of 0.7% by weight) are milled with 20 g of water and 130 g/t of octylxanthate for 5 minutes in a planetary ball mill. 3 g of magnetite ($Fe_3O_4$ having a diameter of from 1 to 5 µm) hydrophobicized with octylphosphonic acid are subsequently added to the mixture and the mixture is milled in the ball mill for a further 5 minutes. The mixture formed is then admixed with 100 ml of water. The magnetic constituents are separated off from the nonmagnetic constituents by magnetic separation in a magnetic separation apparatus known to those skilled in the art. The magnetic residue was dried and, according to analysis, comprises 69.5% of copper.

The nonmagnetic constituents which have been separated off are mixed with 60 g/t of octylxanthate in a stirred vessel for 5 minutes (200 rpm), 3 g of magnetite ($Fe_3O_4$ having a diameter of from 1 to 5 µm) hydrophobicized with octylphosphonic acid are again added and the mixture is once again treated in a stirred apparatus (200 rpm) for 5 minutes. The magnetic constituents are subsequently separated off from the nonmagnetic constituents in a magnetic separation apparatus. In this second separation step, a further 22.8% of the Cu are separated off magnetically, so that a total of 92.3% of the copper is separated off magnetically from the rock. A total of 190 g/t of xanthate are required as hydrophobicizing agent for this purpose.

Comparative Example

The process as described in the example according to the invention is repeated, but the total amount of 190 g/t of octylxanthate is all used in the first conditioning and no second conditioning step is carried out. The yield of Cu is 70% of the Cu present in the porphyritic ore.

The invention claimed is:
1. A process for separating at least one first material from first mixture comprising the at least one first material and at least one second material, the method comprising:
(A) contacting the first mixture comprising the at least one first material and the at least one second material with at least one first surface-active substance, optionally in the presence of at least one dispersion medium, with the first surface-active substance binding to the at least one first material, to obtain a second mixture;
(B) optionally, adding at least one dispersion medium to the second mixture obtained in (A), in order to obtain a first dispersion;
(C) treating the second mixture from (A) or the first dispersion from (B) with at least one hydrophobic magnetic particle so that the at least one first material to which the at least one first surface-active substance is bound and the at least one magnetic particle agglomerate, to obtain an first agglomerate;
(D) separating the first agglomerate from (C) from the second mixture or the first dispersion by application of a magnetic field, in order to obtain a separated agglomerate and a third mixture, M1, depleted in agglomerate;
(E) contacting the third mixture, M1, from (D) with at least one second surface-active substance, with the second surface-active substance binding to the at least one first material which is still present in the mixture, M1, from (D) to obtain a second dispersion;
(F) treating the second dispersion from (E) with at least one hydrophobic magnetic particle so that the at least one first material to which the at least one second surface-active substance is bound and the at least one magnetic particle agglomerate, to form a second agglomerate;
(G) separating the second agglomerate from (F) from the second dispersion by application of a magnetic field in order to obtain the second agglomerate and a fourth mixture, M2, depleted in agglomerate; and
(H) optionally, repeating (E) to (G).
2. The process of claim 1, further comprising:
(I) dissociating the first and second agglomerate which have been separated off in (D) and (G), in order to obtain the at least one first material and the at least one magnetic particle separately.
3. The process of claim 1, wherein the first material comprises a hydrophobic metal compound or coal and the second material is a hydrophilic metal compound.
4. The process of claim 3, wherein the hydrophobic metal compound comprises at least one selected from the group consisting of a sulfidic ore, an oxidic ore, and a carbonate-comprising ore.
5. The process of claim 3, wherein the hydrophilic metal compound comprises at least one selected from the group consisting of an oxidic metal compound and a hydroxidic metal compound.
6. The process of claim 3, wherein the hydrophobic metal compound comprises a sulfidic ore.
7. The process of claim 3, wherein the hydrophobic metal compound comprises an oxidic ore.
8. The process of claim 3, wherein the hydrophobic metal compound comprises a carbonate-comprising ore.
9. The process of claim 1, wherein the surface-active substance comprises a substance of formula (I)

$$A\text{-}Z \quad (I),$$

wherein
A is linear or branched $C_3$-$C_{30}$-alkyl, $C_3$-$C_{30}$-heteroalkyl, optionally substituted $C_6$-$C_{30}$-aryl, optionally substituted $C_6$-$C_{30}$-heteroalkyl, and $C_6$-$C_{30}$-aralkyl, and
Z is a group with which the compound of formula (I) binds to the at least one hydrophobic material.
10. The process of claim 9, wherein Z is selected from the group consisting of —$(X)_n$—$PO_3^{2-}$, —$(X)_n$—$PO_2S^{2-}$, —$(X)_n$—$POS_2^{2-}$, —$(X)_n$—$PS_3^{2-}$, —$(X)_n$—$PS_2^{-}$, —$(X)_n$—$POS^{-}$, —$(X)_n$—$PO_2^-$, —$(X)_n$—$PO_3^{2-}$ —$(X)_n$—$CO_2^-$, —$(X)_n$—$CS_2^-$, —$(X)_n$—$COS^-$, —$(X)_n$—$C(S)NHOH$, and —$(X)_n$—$S^-$, wherein X is selected from the group consisting of O, S, NH, and $CH_2$, and n=0, 1 or 2, optionally with at least one cation selected from the group consisting of hydrogen, an alkali, metal, alkaline earth metal, and $NR_4^+$ wherein the radicals R are each, independently of one another, at least one selected from the group consisting of hydrogen and $C_1$-$C_8$-alkyl.

11. The process of claim 9, wherein, in the substance of formula (I), A is a linear $C_3$-$C_{30}$-alkyl.

12. The process of claim 9, wherein, in the substance of formula (I), A is a branched $C_3$-$C_{30}$-alkyl.

13. The process of claim 9, wherein, in the substance of formula (I), A is a $C_3$-$C_{30}$-heteroalkyl.

14. The process of claim 9, wherein, in the substance of formula (I), A is an optionally substituted $C_6$-$C_{30}$-heteroalkyl.

15. The process of claim 9, wherein, in the substance of formula (I), A is an $C_6$-$C_{30}$-aralkyl.

16. The process of claim 1, wherein the magnetic particle comprises at least one selected from the group consisting of a magnetic metal, a ferromagnetic alloy of at least one magnetic metal, a magnetic iron oxide, a hexagonal ferrite, and a cubic ferrite of formula (II)

$$M^{2+}_x Fe^{2+}_{1-x} Fe^{3+}_2 O_4 \qquad (ii),$$

wherein

M is at least one selected from the group consisting of Co, Ni, Mn, and Zn, and $x \leq 1$.

17. The process of claim 1, wherein the dispersion medium comprises water.

18. The process of claim 1, wherein the first mixture comprising at least one first material and at least one second material is milled to particles having a size of from 100 nm to 100 μm before or during (A).

19. The process of claim 1, wherein the first and second surface-active substances in (A) and (E) are identical.

20. The process of claim 1, wherein the first and second surface-active substances in (A) and (E) are different.

\* \* \* \* \*